(12) United States Patent
Lucchina et al.

(10) Patent No.: US 12,508,380 B2
(45) Date of Patent: Dec. 30, 2025

(54) INTUBATION BOUGIE

(71) Applicant: Prodol Meditec S.A., Vizcaya (ES)

(72) Inventors: Pascal Lucchina, Bordeaux Cauderan (FR); Stephane Checcaroni, Nice (FR); Gilles Dhonneur, Le Plessis Trevise (FR)

(73) Assignee: Prodol Meditec S.A., Biscay (ES)

( * ) Notice: Subject to any disclaimer, the term of this patent is extended or adjusted under 35 U.S.C. 154(b) by 1082 days.

(21) Appl. No.: 17/436,392

(22) PCT Filed: Mar. 11, 2020

(86) PCT No.: PCT/EP2020/056433
§ 371 (c)(1),
(2) Date: Sep. 3, 2021

(87) PCT Pub. No.: WO2020/182851
PCT Pub. Date: Sep. 17, 2020

(65) Prior Publication Data
US 2022/0152329 A1    May 19, 2022

(30) Foreign Application Priority Data
Mar. 11, 2019 (FR) ...................................... 1902466

(51) Int. Cl.
*A61M 16/04* (2006.01)
(52) U.S. Cl.
CPC .... *A61M 16/0418* (2014.02); *A61M 16/0488* (2013.01); *A61M 2205/0216* (2013.01); *A61M 2207/00* (2013.01)

(58) Field of Classification Search
CPC .......... A61M 16/0418; A61M 16/0488; A61M 2207/00; A61B 1/00151; A61B 1/267; A61B 1/00071
See application file for complete search history.

(56) References Cited

U.S. PATENT DOCUMENTS

2002/0183592 A1* 12/2002 Suzuki ................. A61B 8/4466
600/117
2009/0165784 A1*  7/2009 Holtz ................. A61M 16/0488
128/200.26
(Continued)

FOREIGN PATENT DOCUMENTS

EP          2196133 A1 *  6/2010    ......... A61B 1/00071
EP          2 875 841 A1    5/2015

OTHER PUBLICATIONS

International Search Report for PCT/EP2020/056433 dated Jun. 18, 2020 [PCT/ISA/210].

(Continued)

*Primary Examiner* — Kendra D Carter
*Assistant Examiner* — Maap Ellabib
(74) *Attorney, Agent, or Firm* — Sughrue Mion, PLLC

(57) ABSTRACT

The invention relates to an intubation bougie (10) comprising a body (11) and a distal portion (12) formed by at least three elastomer segments (121, 122, 123) with increasing flexibility from one end of said distal portion (12), which is integral with the body (11), to a free end of said distal portion (12) intended to enter the upper airways of a patient. These segments are preferably articulated to one another. A sheath (200) surrounding the segments (121, 122, 123) and a ball end (210) advantageously complement said distal portion (12). The invention also relates to a method for producing such an intubation bougie (10).

19 Claims, 4 Drawing Sheets

(56) References Cited

U.S. PATENT DOCUMENTS

| | | | |
|---|---|---|---|
| 2013/0310650 A1* | 11/2013 | Hales | A61B 1/267 |
| | | | 600/196 |
| 2014/0018626 A1 | 1/2014 | Lee | |
| 2014/0200405 A1* | 7/2014 | Atlas | A61M 16/0488 |
| | | | 128/200.26 |
| 2015/0190587 A1* | 7/2015 | Peh | A61M 5/3287 |
| | | | 604/164.08 |
| 2016/0271528 A1* | 9/2016 | Lin | B01D 35/00 |
| 2016/0287826 A1* | 10/2016 | Field | A61M 16/0816 |
| 2019/0014980 A1 | 1/2019 | Herskovic | |

OTHER PUBLICATIONS

Written Opinion for PCT/EP2020/056433 dated Jun. 18, 2020 [PCT/ISA/237].

* cited by examiner

INTUBATION BOUGIE

CROSS REFERENCE TO RELATED APPLICATIONS

This application is a National Stage of International Application No. PCT/EP2020/056433 filed Mar. 11, 2020, claiming priority based on French Patent Application No. 1902466 filed Mar. 11, 2019.

TECHNICAL SECTOR

The present invention relates to a tracheal intubation device. It has at least one particularly advantageous application for difficult intubations of patients with an offset glottis. It further enables quick and atraumatic intubations to be carried out.

TECHNOLOGICAL BACKGROUND

In the medical field, in order to place an intubation catheter in the upper airways (UA) of a patient, an intubation guide also called an intubation mandrel or even an intubation bougie is generally used.

As illustrated in FIG. 1, the intubation bougie 10 is introduced into the larynx with the assistance of a laryngoscope 20, then into the trachea 4, to guide the intubation catheter into the UA.

Such an intubation bougie 10 is in the form of a flexible and/or malleable rod being able to have a length of approximately 50 cm to 70 cm to reach the patient's trachea 4 while respecting the curved anatomy of the UA.

The intubation bougie 10 can also have a curved and bent portion at the distal end thereof in order to facilitate the entry of the bougie and, in fine, of the catheter into the entry orifice of the trachea 4, referred to as the glottis. 3.

For example, the Eschmann bougie is equipped with an end bent over 1.5 to 2 cm making an angle of approximately 30° with the main longitudinal axis of the bougie.

According to another example, document WO 2016/044438 A1 discloses a device having several flexible or malleable sections enabling it to be bent in different configurations of the intubation bougie.

This device further has a distal section provided with a curved and rounded end.

The practitioner responsible for inserting the bougie searches for a passage channel in the UA of the patient.

During the progression of the bougie in the UA, they seek in particular to feel with the distal end of the bougie anatomical contacts and/or blockages against the cartilaginous structures of the larynx, the glottis, the trachea and then the bronchi, which are located at a distance of approximately 35 to 40 cm from the mouth.

Such progression is usually traumatic for the patient.

In order to facilitate tracheal intubation, videolaryngoscopes (VL) equipped with cameras make it possible to visualize the progress of the bougie and/or the intubation catheter through the passage channel in the UA.

Such a visualisation offers an endoscopic field of view generally offset with respect to the passage channel of the intubation catheter.

Moreover, as illustrated in FIG. 2, this visualisation can lead, in certain patients, to the observation of a glottis 3 which is particularly offset with respect to the endoscopic field of vision 21 of the videolaryngoscope. However, the glottis 3 remains visible, generally in a high position that is more or less lateralised relative to the endoscopic field of vision 21 of the VL.

In this case, it is necessary to guide the flexible intubation catheter to prevent it from being diverted below the glottis towards the oesophagus 5.

Such an intubation corresponds to a difficult intubation situation requiring an easy-to-handle, agile, easily controllable and atraumatic intubation bougie, enabling quick intervention.

The intubation bougies mentioned above are not suitable for such difficult intubation situations.

In particular, the handling ability of such intubation bougies is often crude, correct at best. Their controllability is very limited. Their agility is almost zero.

These bougies are also generally damaging.

Lesions of the anterior mucous membrane of the trachea and haemorrhagic and infectious accidents secondary to penetrating tracheal wounds (perforations) have been observed with such intubation bougies.

These bougies therefore do not allow rapid intubation, the fear of injuring the patient being constant for the practitioner who hesitates to perform certain actions to open the passage channel to the trachea. The patient is in respiratory distress throughout the intubation, until the intubation tube is effectively in place in the bronchi.

The difficulties encountered with these bougies can therefore create extremely serious situations with risks of lesions and subsequent complications for the patient.

Moreover, the price thereof is high and constitutes a very large part of the total cost of tracheal intubation.

An object of the present invention is to at least partially overcome some of the drawbacks mentioned above.

More particularly, according to one aspect, the invention aims to provide an intubation device enabling quick and atraumatic tracheal access, suitable for difficult intubation situations.

According to another aspect, the invention aims to provide a method of manufacturing such an intubation device, making it possible to limit the cost of manufacturing this device.

SUMMARY

A first aspect of the invention relates to an intubation bougie in the form of a rod comprising a body having a first longitudinal axis, referred to as terminal axis, and a distal portion extending from the body.

Advantageously but without limitation, the distal portion comprises at least three segments distinct from each other, arranged successively and configured so as to give the distal portion an increasing flexibility from a first end of the distal portion integral with the body to a second free end of the distal portion, opposite the first end and intended to enter the upper airways of a patient.

The intubation bougie according to the invention thus enables the combination of good controllability thanks to the body of the bougie and significant agility at the distal portion thanks to the segments giving increasing flexibility to the distal portion up to the second free end thereof.

The intubation bougie according to the invention therefore has great handling ability allowing it to overcome different anatomical structures, in particular during difficult intubation.

The increasing flexibility of the distal portion of the bougie further promotes atraumatic use.

According to a preferred embodiment of the invention, the distal portion is configured to reach glottis that are difficult to access, in particular glottis that are off-centre in an endoscopic field of view of a videolaryngoscope.

The segments, preferably made of elastomer, of the distal portion are offset, and preferably articulated, with respect to one another so as to form a horn. This horn advantageously makes it possible to reach glottis that are off-centre with respect to the terminal axis of the body of the bougie.

This horn also enables the compensation for the offset between the optical axis of the video laryngoscope camera and the passage channel of the bougie.

According to a particularly advantageous and optional possibility, the body of the bougie further comprises longitudinal slots. These longitudinal slots make it possible to limit the friction between the intubation catheter and the body of the bougie. The rotation of the bougie in the intubation catheter is thus facilitated. The controllability of the bougie is improved.

These slots can also cooperate with an optional ventilation sheath fitted around the perimeter of the body of the bougie. In this case, they form channels for the passage of a fluid, for example oxygen.

This advantageously enables the injection of oxygen or the ventilation of the patient during intubation, before the final placement of the intubation catheter in the bronchi.

A second aspect of the invention relates to a method of manufacturing an intubation bougie according to the first aspect of the invention comprising at least the following step or steps:

Moulding, preferably by injection, the body and the at least three segments of the distal portion of the bougie simultaneously from a first material, Preferably, overmoulding the at least three segments of the distal portion so as to form a distal portion comprising a core made of the first material and a sheath of a second material different from the first material. The first material is preferably a thermoplastic elastomer material of the SEBS type. The second material is preferably a thermoplastic elastomer material of the SEBS type which is more flexible than the first material. The overmoulding is preferably carried out by thermoplastic injection.

The intubation bougie can thus be manufactured in one or two quick industrial steps, by thermoplastic injection.

This process makes it possible to manufacture intubation bougies according to the first aspect of the invention in very large batches. Automation and robotisation systems are also well suited to this type of method. This process enables very good reproducibility and constant quality for such intubation bougies to be obtained.

Such a method advantageously enables the limitation of the manufacturing costs of the intubation bougie.

According to another aspect, the invention relates to an intubation bougie comprising a body and a distal portion extending from the body. The distal portion comprises at least three segments arranged successively along the distal portion, two successive segments being separated by a discontinuity, so as to give the distal portion an increasing flexibility from a proximal end of the distal portion integral with the body to a free distal end of the distal portion, opposite the first end and intended to enter the upper airways of a patient.

The discontinuity separating two consecutive segments being at least one of a material discontinuity and a dimension discontinuity, typically a section discontinuity. At a given point of the distal portion, the section is taken along a plane perpendicular to the tangent at this point. For example, the discontinuity is formed by a non-continuous section reduction and by a change of material. According to another embodiment, the discontinuity is only formed by a non-continuous section reduction, without a change of material between the two adjacent segments.

The distal portion and the body are preferably also discontinuous, in section and/or in material. This discontinuity between the body and the distal portion makes it possible to form a first joint. The distal portion is thus articulated with respect to the body. This also makes it easy to distinguish the distal portion from the body of the bougie.

The intubation bougie according to the invention is inexpensive, due to the method of manufacturing, and therefore widely accessible and usable by many practitioners. It is not traumatic for the patients. It is easy to handle and can be used with laryngoscopes and videolaryngoscopes. It is controllable and agile, which enables simple, risk-free and, consequently, quick tracheal access.

The intubation bougie according to the invention can therefore be used in situations requiring quick tracheal access, in particular in emergency medicine.

The intubation bougie according to the invention can also be used in patients having predictive criteria for difficult tracheal intubation.

BRIEF INTRODUCTION OF THE FIGURES

Other characteristics, aims and advantages of the present invention will become apparent upon reading the following detailed description, and with regard to the attached drawings provided by way of non-limiting examples and in which.

DETAILED DESCRIPTION

Figure 1:
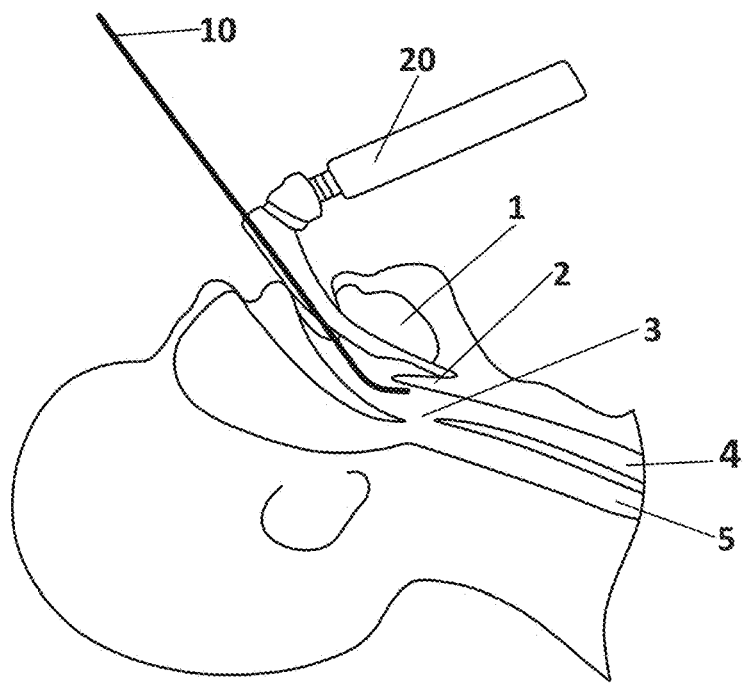
FIG. 1 illustrates an intubation situation.
Figure 2:
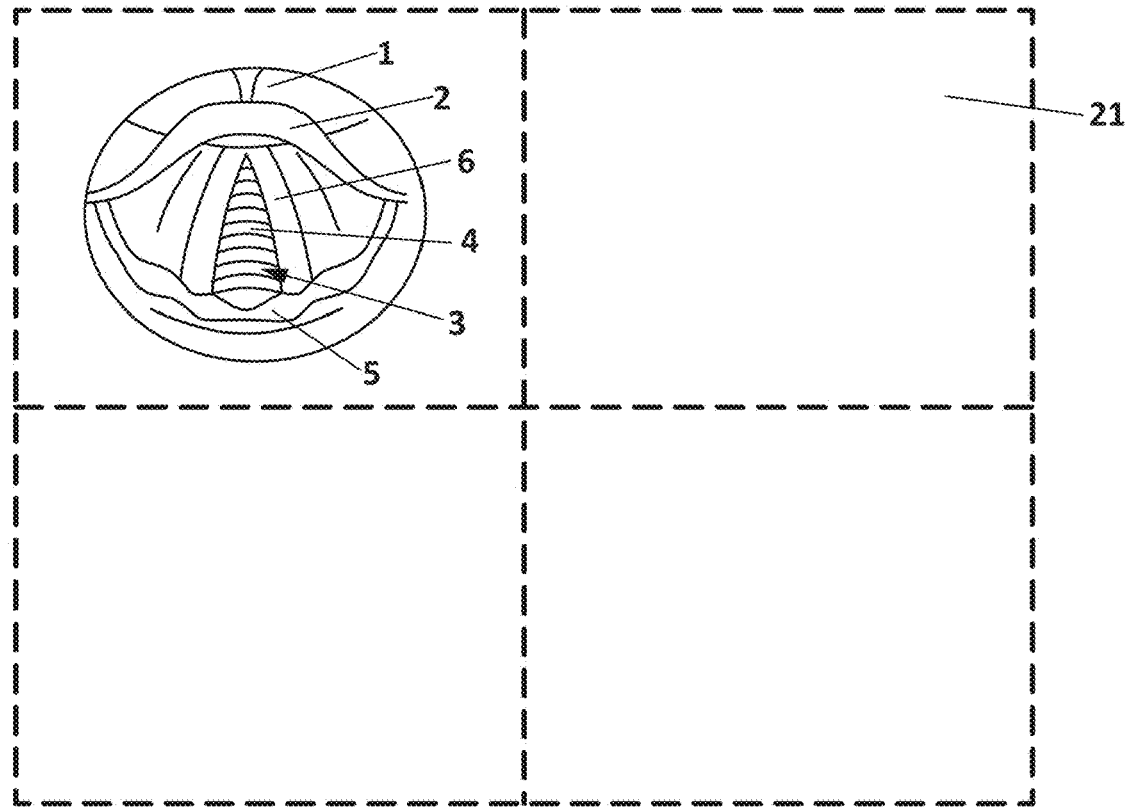
FIG. 2 illustrates the position of a difficult-to-access glottis in an endoscopic field of view of a videolaryngoscope.

The invention according to the first aspect thereof comprises in particular the optional features below which can be used in combination or alternatively:

According to an embodiment, the at least three segments respectively have at least three segmental flexibilities that are different from one another, such that the distal portion has increasing flexibility, possibly discontinuous. The segmental flexibilities thus increase the closer to the free end of the distal portion. The distal portion does not necessarily have discontinuous flexibility. This promotes retrograde bending of the distal portion, from the second free end to the first end, as the bougie advances through the UA.

According to an embodiment, the increasing flexibility of the distal portion is induced by a reduction in the cross section of said at least three segments with respect to one another.

The reduction in cross section can take place in stages or in a progressive and substantially constant manner.

According to an embodiment, the at least three segments are articulated with respect to one another.

According to one embodiment, the bougie has a discontinuity between the body and the distal portion. This discontinuity can be formed by a change of materials, a change of dimension, typically a change of section in a plane perpendicular to the terminal axis T. This discontinuity can also be materialized by a section reduction, such as a diameter reduction, or by a first rib.

According to an embodiment, a joint between two adjacent segments among the at least three segments is induced by a sudden change in cross section between each of said two adjacent segments. Typically, this sudden change is formed by, preferably only by, a non-continuous variation or by a chamfer forming for example an angle with each of said two adjacent segments of between 30° and 90°. The non-continuous variation between an adjacent first segment and second segment is for example such that, for a first segment with regard to the first end of the distal portion and having a diameter $\phi1$, the second segment with regard to the second end of the distal portion has a diameter $\phi2<0.8.\phi1$.

According to a preferred embodiment, a joint between two adjacent segments among the at least three segments is formed by at least one groove. This groove, referred to as transverse groove, can for example extend mainly in a plane transverse to a main direction of extension of the distal portion at the groove. This transverse groove may be in the form of a recess between two adjacent cylindrical segments. This recess can extend over the entire perimeter of the distal portion so as to define a closed contour. Alternatively, this recess can extend over only part of the perimeter of the distal portion so as to define an open contour. The width of this groove is less than the length of each of the segments it separates.

According to an embodiment, at least one segment among the at least three segments is articulated and has a segmental flexibility enabling a folding back by inversion of the second free end of the distal portion, for example in the event said free end is blocked against an anatomical structure.

This improves the agility of the distal portion and, indeed, of the intubation bougie. This also makes it possible to increase the safety of use of the bougie by improving the anti-traumatic nature of the distal portion.

According to an embodiment, the body has a terminal longitudinal axis T and, at least when no force is applied to the intubation bougie, at least one segment among the at least three segments is offset with respect to this terminal axis T of the body of the intubation bougie.

This misalignment enables off-centre glottis to be reached in an endoscopic field of view of a videolaryngoscope.

According to an embodiment, the offset of the at least one segment among the at least three elastomer segments with respect to the terminal axis T of the body of the intubation bougie forms an angle $\alpha$ of between 1° and 80°, preferably between 10° and 30°. This angle is preferably greater than or equal to 20°.

According to an embodiment, the body of the bougie comprises a proximal portion extending according to a proximal longitudinal axis B, and a terminal portion extending according to a terminal longitudinal axis T and connected to the distal portion of the bougie. The terminal axis T forms an angle $\beta$ with respect to the proximal longitudinal axis B of between 1° and 90°, preferably between 3° and 20°. This angle is preferably greater than or equal to 5°. The segment of the distal portion in the immediate vicinity of the terminal portion of the body may have an offset with regard to the terminal axis T according to an angle $\alpha$ of between 1° and 80°, preferably between 10° and 30°. This angle is preferably greater than or equal to 20°.

According to an embodiment, the terminal portion of the body of the bougie comprises a succession of curvatures, for example S-shaped.

According to an embodiment, the second free end of the distal portion comprises an attachment element such as a ball end.

A ball end having a diameter greater than the diameter of the last segment among the at least three segments, referred to as the terminal segment, enables an atraumatic attachment element to be formed.

Preferably, the second free end of the distal portion is formed by the attachment element. Thus, the intubation bougie does not extend beyond the attachment element.

According to an embodiment, the attachment element is offset with respect to a second longitudinal axis S of a terminal segment among the at least three segments.

This offset is preferably oriented so as to approximately compensate a deviation generated by a first offset between the body of the bougie and at least one among the at least three segments of the distal portion. This enables the attachment of anatomical structures to be promoted. This enables the overcoming of the chicanes of the trachea to be optimised.

The attachment element is integral with an end portion that extends along an axis different from the second longitudinal axis S. Thus, the terminal segment has at least one bend. A proximal portion of the terminal segment extends from a segment adjacent to the terminal segment and to the bend. This proximal portion of the terminal segment extends according to the second longitudinal axis S. The terminal segment further comprises a distal portion.

This distal portion extends between the bend and the attachment element. This distal portion extends according to an axis different from the longitudinal axis S.

According to an embodiment, the offset of the attachment element with respect to the second longitudinal axis (S) of a terminal segment among the at least three segments forms an angle $\gamma$ greater than or equal to 30° and preferably between 30° and 90°. This angle is preferably greater than or equal to 60°.

According to an embodiment, the body comprises at least one longitudinal slot over part of the length thereof.

According to an embodiment, the bougie further comprises a ventilation sheath configured to cooperate with the at least one longitudinal slot so as to allow a passage of fluid towards the distal portion.

The at least one slot facilitates the ventilation of the patient, in particular when it cooperates with a ventilation sheath fitted to the body of the bougie. It thus reduces the risk of suffocation of the patient who can be oxygenated during the intervention of the practitioner. It also makes it easier for the practitioner to grip the body of the bougie, by creating a non-slip effect. It therefore improves the controllability of the bougie. It further enables a relative sliding to be facilitated between the wall of an intubation catheter and the body of the bougie inserted into said intubation catheter, by reducing friction. It therefore improves the handling ability of the bougie.

According to an embodiment, the distal portion comprises a core formed by the at least three segments and a sheath surrounding the core and formed from a material different from that of said at least three segments.

The sheath is preferably overmoulded around the core. It enables direct contact to be avoided between the at least three segments and the mucous membranes or anatomical structures of the UA.

It makes the distal portion less traumatic for the patient. It also enables the modification of the mechanical properties of the distal portion, for example by acting as a return spring when the distal portion is deformed.

According to an embodiment, the overmoulded sheath is inserted into the grooves or the recesses forming the joints between the adjacent segments of the distal portion. The at least one transverse groove is filled with the material forming the sheath and therefore forms at least one intersegmental pad. These intersegmental pads have a function comparable to that of the intervertebral discs of a spine. They make it possible to reinforce the agility, handling ability, antitraumatic safety qualities of the bougie. They further provide increased tenacity in the intersegmental joints. They also increase the stiffness of the joints, which induces an additional return force when the distal portion is deformed. The distal portion thus has good shape memory and good reactivity to deformation.

According to an embodiment, the sheath extends towards the second free end of the distal portion so as to form at least one other segment in a material different from that of said at least three segments.

This extension makes it possible to cushion contact with an anatomical structure, in particular during a blockage in the advance of the intubation bougie.

According to an embodiment, the core extends substantially to the second free end of the distal portion.

The forces applied by the practitioner to the body are transmitted to the second free end of the distal portion in an optimised manner. The controllability of the bougie is improved.

According to an embodiment, the intubation bougie further comprises a control handle at the proximal part of the body.

This improves the controllability of the bougie.

According to an embodiment, the control handle is slidably mounted on the body of the bougie. Preferably it is slidably mounted on the proximal portion and on a part of the body.

A sliding handle enables a use of the bougie with an initial hand hold as close as possible to the distal portion. The handle can then be moved towards the proximal portion of the body as the bougie advances through the UA. This guarantees optimised handling ability and controllability throughout the advance of the bougie in the UA.

According to an embodiment, the control handle is removably mounted on the body of the bougie.

According to an embodiment, the at least three segments are made of an elastomer material, preferably of a thermoplastic elastomer material of the SEBS type.

The invention according to the second aspect thereof comprises in particular the optional features here below which can be used in combination or alternatively:

According to an embodiment, the method of manufacturing further comprises an overmoulding of at least three segments of the distal portion so as to form a distal portion comprising a core made of a first material, preferably obtained by moulding, and a sheath in a second material, preferably obtained by overmoulding, the second material preferably being different from the first material.

According to an embodiment, the first material is an elastomer material, preferably a thermoplastic elastomer material of the SEBS type. The second material can be an elastomer material of the same type as the first material. It preferably has a lower hardness than that of the first material. Thus, it enables a soft contact effect, referred to as "soft touch", which is completely atraumatic when in contact with fragile anatomical walls.

In the remainder of the description and the claims, the terms "guide", "mandrel" and "bougie" are used synonymously. The intubation bougie is configured to guide the intubation catheter into the UA. The intubation catheter is hollow and tubular. It enables oxygen to be brought to the intubated patient. Conversely, the intubation bougie is neither tubular nor hollow. It is preferably solid or longitudinally ribbed. It is designed to cooperate with the intubation catheter. The person skilled in the art knows perfectly well how to differentiate an intubation bougie from an intubation catheter. Thus, an intubation catheter is necessarily hollow and tubular for the person skilled in the art, implicitly. Likewise, implicitly, an intubation bougie is not hollow for the person skilled in the art.

In the present invention, the flexibility of the distal portion can be obtained according to different embodiments which may optionally be combined with one another.

The flexibility of the distal portion increases in the direction of the free distal end of the distal portion.

This means that for a portion with a given length, the distal portion exhibits increasing flexibility as this portion moves closer to the distal end.

Thus if a part P1 of the distal portion has a length L1 and a flexibility S1, a part P2 of length L2=L1, located between the part P1 and the distal end of the distal portion has a flexibility S2, such that S2>S1.

The length of the part is measured according to the curve according to which the distal part predominantly extends.

For example and in a non-limiting manner, the segments themselves can each have a so-called segmental flexibility. This segmental flexibility can be induced by the material forming the segment. This material may in particular have mechanical properties, for example comparable to those of an elastomer and enabling elastic deformation of the segment. For a given material, the shape and dimensions of the segment, in particular its length and diameter, can influence the ability of the segment to deform and therefore the segmental flexibility thereof.

The flexibility of the distal portion may furthermore be due at least partially to one or more intersegmentary joints.

The increasing flexibility of the distal portion in the direction of the free distal end thereof may for example mean that for adjacent segments Sn−1, Sn and Sn+1, the segment Sn being arranged between the segment Sn−1 and the segment Sn+1, and the Sn+1 segment being arranged on the side of the free distal end, that is to say between the segment Sn and the distal end of the distal portion, the deformation of the distal portion at the segment Sn is relatively more significant than at the segment Sn−1, and the deformation of the distal portion at the segment Sn+1 is relatively greater than at the segment Sn.

In particular, by keeping segment Sn fixed and applying a force at one end of the segment Sn+1 on a side opposite to the segment Sn (i.e., by applying an identical force on the distal end of the segment Sn+1), the bending of the segment Sn+1 will be greater than the bending of the segment Sn obtained by keeping the Sn−1 segment fixed and applying the same force at one end of the Sn segment on a side opposite to the segment Sn−1 (i.e., by applying an identical force to the distal end of the segment Sn).

The flexibility of the distal portion can also be seen to be a function of or corresponding to the ability of a segment Sn, in particular to the ability of the end of this segment Sn, to move relative to the adjacent segment Sn−1. This displacement is taken in a plane perpendicular to the longitudinal axis along which the segments extend, typically the axis S. This displacement obviously does not take place along or parallel to the longitudinal axis S. The segments do not are not designed to slide relative to each other. The bougie is configured such that there is no translation of one segment relative to another segment of the distal portion. The distal portion is not telescopic.

For example, the flexibility of the distal portion can be measured by measuring the displacements of the segments relative to each other, as follows:

For the segment Sn−1 located between the body and the segment Sn, by holding the body and applying a force F to the end of the segment Sn−1 opposite the body, a first displacement of the end of the segment Sn−1 is measured. This first displacement corresponds to the deflection f1 of the segment Sn−1 under bending by the force F. For the segment Sn located between the segment Sn−1 and the segment Sn+1, by maintaining the segment Sn−1 and applying the force F to the end of the segment Sn opposite to the segment Sn−1, a second displacement of the end of the segment Sn is measured. This second displacement corresponds to the deflection f2 of the segment Sn under bending by the force F.

For the segment Sn+1 located between the segment Sn and the free end of the distal portion, by maintaining the segment Sn and applying the force F to the end of the segment Sn+1 opposite to the segment Sn, a third displacement of the end of the segment Sn+1 is measured. This third displacement corresponds to the deflection f3 of the segment Sn+1 under bending for the force F.

If f3>f2>f1, then the flexibility of the distal portion increases in the direction the free end thereof.

Thus, in the present description, the term flexibility of the distal portion or of a segment can be replaced by the term displacement, displacement capacity, deformation, deformation capacity, bending, bending capacity of a segment.

In the following, the Shore hardness scale is a scale used to measure the hardness of elastomers and certain plastics.

The term "handling ability" is understood to mean in particular the ease with which the operator holds the intubation guide with a view to an introduction into the UA. Handling ability can be compared to the general ergonomics of the guide and results mainly from its general shape.

The term "controllability" is understood to mean in particular the capacities of the guide to direct the distal end thereof in the three spatial directions from a force exerted by the operator on a proximal portion of the intubation guide.

The term "agility" is understood to mean in particular the ability of the distal end to overcome obstacles, chicanes, to move inside the orifices and to deform in order to match successive breaks of the axis of progression that are relatively close. Agility can also be understood as the ability of the distal end of the guide to reach offset orifices of a distance of between 1 cm and 4 cm from the main longitudinal axis of the body of the guide.

Agility can also be understood as the ability of the distal end to turn to substantially form an angle of 180° with the initial orientation thereof, and/or to be flattened.

Agility can therefore represent the ability of the distal end to advance without blocking through successive narrowings in an initial configuration or in an everted configuration.

The terms "substantially", "approximately", "to the order of" mean "within 10%" or, in the case of an angular orientation, "within 10°".

When two elements, for example segments, are offset, it is understood that in a neutral position, that is to say without stress applied on the intubation bougie (other than gravity), these two elements do not extend along the same axis.

The different offsets and angles α, β, γ do not necessarily occur in the same plane. They are preferably chosen from different planes.

The present invention shall now be described through preferred but non-limiting embodiments.

Figure 3:
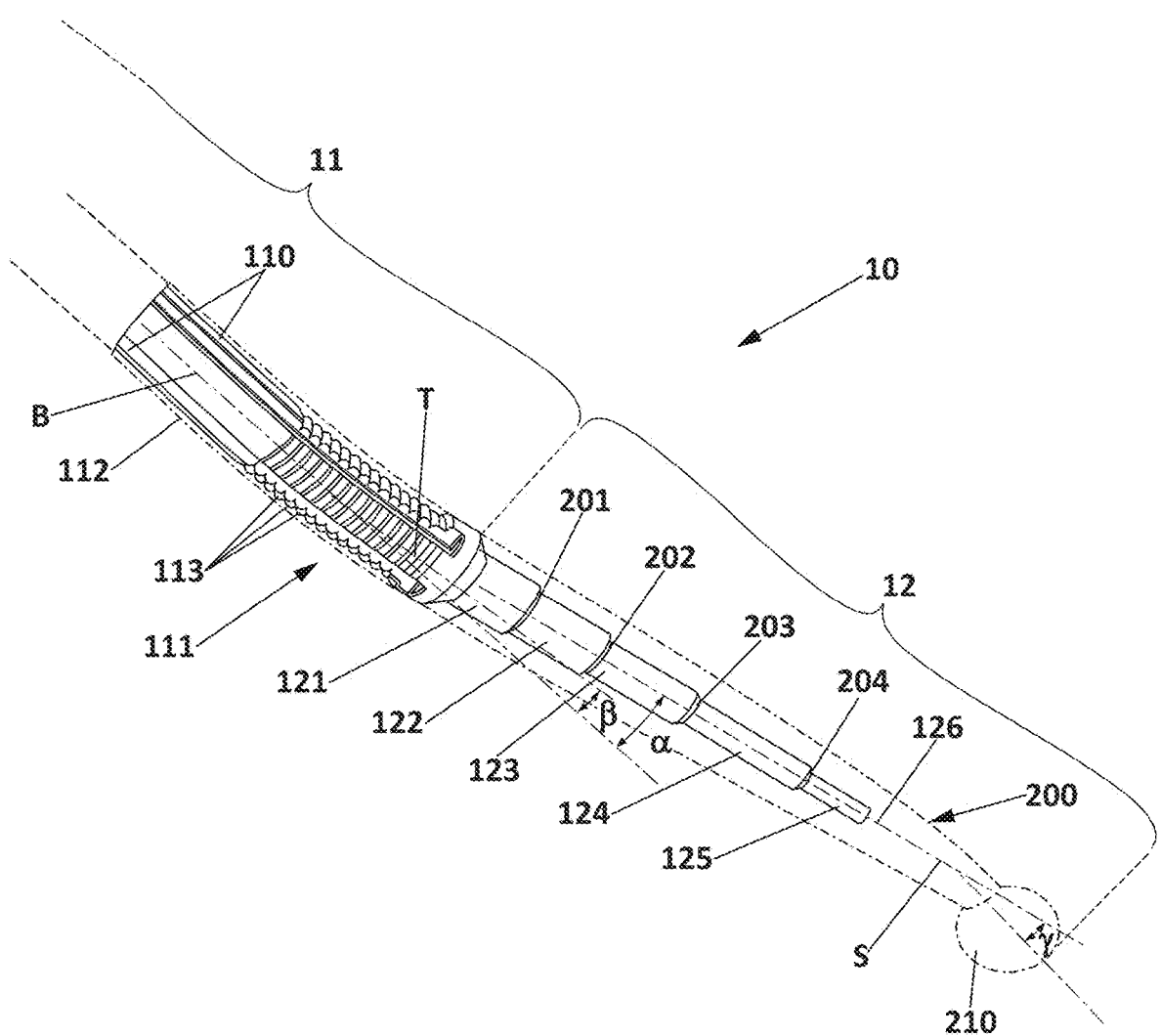
FIG. 3 shows a wired view of the intubation bougie according to a first embodiment of the invention.

According to a first embodiment of the intubation bougie illustrated in FIG. 3, the bougie 10 comprises a body 11 having a length of between 25 cm and 80 cm, and a distal portion 12 of a few centimetres, intended to be introduced into the upper airways of the patient.

This body 11 has the shape of a rod extending mainly according to a longitudinal axis B.

The body 11 comprises a proximal portion (not shown) intended to remain outside the upper airways of the patient, and a terminal portion 111.

The terminal portion 111 extends at least according to a terminal longitudinal axis T at one side intended to be made integral with the distal portion 12.

The terminal portion 111 can therefore be in the form of an intermediate portion between the proximal portion of the body 11 and the distal portion 12 of the bougie.

This terminal portion 111 is preferably offset with respect to the longitudinal axis B. It can comprise one or more curvatures, according to the same direction forming for example a C, or according to opposite directions forming for example an S.

The terminal axis T forms, for example, an angle α of approximately 20° with respect to the longitudinal axis B.

This terminal portion 111 thus enables a first degree of handling ability of the bougie 10 to be obtained.

The terminal portion 111 of the body 11 is connected to the distal portion 12.

As the introduction of the bougie 10 advances into the UA, the gripping position of the practitioner moves on the body 11 towards the proximal portion.

The length of the body 11 can advantageously be defined and chosen depending on the application, for example with a Macintosh laryngoscope, or for a difficult intubation with an intubation assistance under videolaryngoscopy. The external diameter of the bougie 10 is preferably of between 3 mm and 4 mm. In particular, a bougie having a diameter of 3 mm is more suitable for paediatric use and a bougie having a diameter of 4 mm is more suitable for use in adults.

The body 11 enables the forces applied at the gripping position to be transmitted to the distal portion 12 of the bougie.

The handling ability and/or the controlling of the bougie 10 is only carried out by means of the body 11 as soon as the distal portion 12 is introduced into the UA.

The advance of the bougie 10 in the UA can be carried out by a helical movement.

The body 11 is therefore configured to transmit to the distal portion 12 the translational and rotational movements exerted at the gripping position with the least possible inertia and as much precision as possible.

The body 11 is preferably made of thermoplastic elastomer, for example of Styrene Ethylene Butylene Styrene (SEBS).

It preferably has flexibility with a high shape memory and a hardness of between 60 and 80 shore D.

The bougie 10 may have been introduced beforehand into an intubation catheter before intubation of the patient, in particular in the case of an intubation carried out with a videolaryngoscope. In this case, the intubation catheter in the form of a tube, sheaths the body 11 of the bougie and at least partly the distal portion 12, possibly only leaving the ball end 210 visible.

The body 11 can advantageously comprise longitudinal grooves 110.

These grooves 110 enable a passage of fluid to be provided within the body 11 of the bougie 10, in particular so as to allow ventilation of the patient during intubation.

In this case, the body 11 is preferably covered over the entire length thereof by a heat-shrinkable ventilation sheath 112 and adjusted around the perimeter of the body 11. This ventilation sheath 112 thus forms, with the slots 110, a network of pipes capable of conveying the fluid, for example oxygen, within the bougie 10. The terminal portion 111 of the body 11 preferably comprises transverse grooves 113 making it possible to maintain the heat-shrunk ventilation sheath 112.

The grooves 110 furthermore enable the reduction of the friction between the body 11 and the catheter sheathing the body 11. The handling ability and agility of the assembly are improved.

The grooves 110 of the body 11 also enable the grip of the practitioner to be improved, in particular to perform rotational movements about the longitudinal axis B.

Preferably but optionally, only the bougie 10 can be equipped with a sliding handle intended to improve the gripping and the control of the bougie 10.

This sliding handle is preferably removable.

It slides translationally along the body 11 according to the longitudinal axis B.

It can be locked in a gripping position by a quick clamping system.

Such a handle enables the bougie 10 to be controlled precisely and efficiently, at different gripping positions throughout the introduction of the bougie 10 into the UA.

The grooves 110 of the body 11 can advantageously serve as a guide or rail for the translational sliding of the sliding handle, and enable a blocking in rotation of the sliding handle ensuring an immediate and precise return of the force applied by the practitioner on the handle.

This enables, for example, an angle about the longitudinal axis B to be firmly maintained while pushing the bougie further forward into the UA.

The distal portion 12 of the bougie 10 can comprise a succession of elastomer segments 121, 122, 123, 124, 125 linked to each other from the first end of the distal portion 12 integral with the terminal portion 111 of the body 11 towards the second free end of the distal portion 12. The first end of the distal portion 12 thus corresponds to a proximal end of the distal portion 12. The second end of the distal portion 12, also called the free end, thus corresponds to a distal end of the distal portion 12.

The flexibility is increasing along this succession of segments 121, 122, 123, 124, 125.

According to a preferred embodiment, each elastomer segment has, for example, greater flexibility than the segment which immediately precedes it.

For segments made of thermoplastic elastomer material, the increase in flexibility can be obtained by a decreasing variation of the transverse diameters, possibly combined with an increase in the lengths, of said segments 121, 122, 123, 124, 125.

For a body 11 with a diameter substantially equal to 4 mm (intubation in adults), the distal portion 12 may comprise five thermoplastic elastomer segments 121, 122, 123, 124, 125 preferably articulated with respect to each other.

For a body 11 with a diameter substantially equal to 3 mm (paediatric intubation), the distal portion 12 may comprise four thermoplastic elastomers segments 121, 122, 123, 124 preferably articulated with respect to each other.

The distal portion 12 of the bougie 10 comprises for example a first segment 121 which is more flexible than the body 11.

This first segment 121 may have a length of between 3 and 4 mm and a curved rounded cylindrical shape.

It may have a transverse diameter substantially equal to 3.2 mm for a body 11 with a diameter substantially equal to 4 mm (adult intubation), or a transverse diameter substantially equal to 2.7 mm for a body 11 with a diameter substantially equal to 3 mm (paediatric intubation).

The longitudinal axis thereof is preferably inclined at an angle of between 5° and 50° relative to the terminal axis T of the terminal portion 111 of the body 11.

It can be curved so as to initiate an additional deviation for the next segment 122.

It can be made of a thermoplastic elastomer material such as SEBS.

It may have greater flexibility than the body 11 despite an identical shore hardness of between 60 and 80 Shore D.

This first segment 121 enables the distal portion 12 to be oriented in a direction different from that carried by the terminal axis T and/or the longitudinal axis B of the bougie 10.

It makes it possible in particular to accentuate or to form a bend between the body 11 and the distal portion 12.

This promotes access to offset glottis 3 in an endoscopic field of view 21 of a videolaryngoscope.

This first segment 121 gives the distal portion 12 an initial agility.

The distal portion 12 of the bougie 10 preferably comprises a second segment 122 which is more flexible than the first segment 121.

This second segment 122 may have a length of between 3 and 5 mm and a cylindrical shape.

It can be in the axis and the extension of the first segment 121.

It is preferably made of a thermoplastic elastomer material such as SEBS.

It may have a transverse diameter substantially equal to 2.5 mm for a body 11 with a diameter substantially equal to 4 mm (adult intubation), or a transverse diameter substantially equal to 2 mm for a body 11 with a diameter substantially equal to 3 mm (paediatric intubation).

Alternatively, it may have an average transverse diameter less than or equal to 80% of that of the first segment 121.

It preferably has greater flexibility than the first segment 121, and an identical shore hardness of between 60 and 80 Shore D.

The second segment 122 is advantageously articulated with respect to the first segment 121, by means of a joint 201.

This joint 201 can be obtained by a sudden reduction of the transverse diameter between the first and second segments 121, 122. This sudden reduction is for example formed by a chamfer the slope of which has an angle of between 30° and 90°.

This enables very good agility and very good precision to be given to the bougie. The distal portion 12 of the bougie 10 preferably comprises a third segment 123 which is more flexible than the second segment 122.

This third segment 123 may have a length of between 4 and 6 mm and a cylindrical shape.

It can be in the axis and the extension of the second segment 122.

It is preferably made of a thermoplastic elastomer material such as SEBS.

It may have a transverse diameter substantially equal to 2.3 mm for a body 11 with a diameter substantially equal to 4 mm, or a transverse diameter substantially equal to 1.9 mm for a body 11 with a diameter substantially equal to 3 mm.

Alternatively, it may have an average transverse diameter less than or equal to 80% of that of the second segment 122.

It preferably has greater flexibility than the second segment 122 and an identical shore hardness of between 60 and 80 Shore D.

The third segment 123 is advantageously articulated with respect to the second segment 122, by means of a joint 202.

It is preferably made of a thermoplastic elastomer material such as SEBS.

It may have a transverse diameter substantially equal to 1.5 mm on the side of the fourth segment 124, varying progressively up to 1 mm on the opposite side, for a body 11 with a diameter substantially equal to 4 mm.

It preferably has greater flexibility than the fourth segment 124 and an identical shore hardness of between 60 and 80 Shore D.

The fifth segment 125 is advantageously articulated with respect to the fourth segment 124, by means of a joint 204.

This joint 204 can be obtained by a sudden reduction of the transverse diameter between the fourth and fifth segments 124, 125.

By way of illustration, the main dimensions of the segments 121, 122, 123, 124, 125 and joints 201, 202, 203, 204 are summarised in the table below:

| No. | Segments | | | | | Joints | | | |
|---|---|---|---|---|---|---|---|---|---|
|  | 121 | 122 | 123 | 124 | 125 | 201 | 202 | 203 | 204 |
| Diameter (mm) | 3.24 | 2.50 | 1.75 | 1.00 | 0.50 | 2.50 to 3.24 | 1.75 to 2.50 | 1.00 to 1.75 | 0.50 to 1.00 |
| Length (mm) | 3.45 | 4.45 | 5.45 | 5.82 | 2.82 | 0.30 | 0.30 | 0.30 | 0.18 |

This joint 202 can be obtained by a sudden reduction of the transverse diameter between the second and third segments 122, 123.

The distal portion 12 of the bougie 10 preferably comprises a fourth segment 124 which is preferably more flexible than the third segment 123.

This fourth segment 124 may have a length of between 4 and 6 mm and a cylindrical shape.

It can be in the axis and the extension of the third segment 123.

It is preferably made of a thermoplastic elastomer material such as SEBS.

It may have a transverse diameter substantially equal to 1.8 mm for a body 11 with a diameter substantially equal to 4 mm, or a transverse diameter substantially equal to 1.2 mm for a body 11 with a diameter substantially equal to 3 mm.

Alternatively, it may have an average transverse diameter less than or equal to 80% of that of the third segment 123.

This fourth segment 124 may be the terminal segment of the distal portion 12 of the bougie 10, in particular of a bougie 10 for paediatric use, the body 11 of which has a diameter of approximately 3 mm.

The fourth segment 124 preferably has greater flexibility than the third segment 123 and an identical shore hardness of between 60 and 80 Shore D.

It is advantageously articulated with respect to the third segment 123, by means of a joint 203.

This joint 203 can be obtained by a sudden reduction of the transverse diameter between the third and fourth segments 123, 124.

The distal portion 12 of the bougie 10 may comprises a fifth segment 125 which is preferably more flexible than the fourth segment 124.

This fifth segment 125 is in this example the terminal segment of the succession of segments 121, 122, 123, 124, 125.

It may have a length of between 3 and 5 mm and a cylindrical shape.

It can be in the axis and the extension of the fourth segment 124, according to a longitudinal axis S.

According to this first embodiment illustrated in FIG. 3, the distal portion 12 comprises a sheath 200 overmoulded around the segments 121, 122, 123, 124, 125.

This overmoulded sheath 200 enables the sudden changes in cross sections at the level of the joints 201, 202, 203, 204 of the various segments 121, 122, 123, 124, 125 to be smoothed.

This makes it possible to obtain a more homogeneous deformation of the distal portion 12. The flexibility is therefore more progressive along the distal portion 12. This also enables the distal portion 12 to be made atraumatic.

The sheath 200 has in particular a diameter substantially identical to that of the body 11 at the first segment 121. The diameter thereof gradually decreases along the segments 121, 122, 123, 124, 125 to reach approximately 2.8 mm at the terminal segment.

It can be made of a material different from the body 11 and the segments 121, 122, 123, 124, 125.

It can be more flexible and have a hardness of between 60 and 80 shore A for example.

It is preferably made of a thermoplastic elastomer material with a "soft touch" type finish, i.e. a smooth and soft surface state.

The sheath 200 preferably extends along the S axis beyond the terminal segment.

It can form another segment 126 with a diameter substantially equal to 2.8 mm comprising a ball end 210 with a diameter of between 4 mm and 5 mm.

This ball end 210 corresponds to the free end of the distal portion 12.

The ball end 210 makes it possible to attach an anatomical structure such as a vocal cord 6.

It is preferably offset by an angle γ relative to the longitudinal axis S.

This offset can be oriented so as to compensate for the deviation generated by the first segment 121.

Preferably, this offset forms an angle γ greater than or equal to 45°, preferably greater than or equal to 50°. According to an example, this angle is between 50° and 55°.

This enables the handling ability and precision of the intubation bougie to be greatly improved.

The end ball 210 is preferably oriented on a side opposite to the inner side of the bend formed by the distal portion 12 and the body 11.

This the attachment of anatomical structures to be optimised and the overcoming of the chicanes to be improved.

The elastomer sheath material 200 is preferably translucent, and preferably blue in colour.

This enables a light emitted by a light-emitting diode of the laryngoscope or of the videolaryngoscope for example to be transmitted and diffused.

The light thus diffused by the sheath 200 of the distal portion 12 enables the surrounding walls and/or anatomical structures to be illuminated.

The bluish light enables the best contrast with the anatomical structures of the UA to be obtained.

For the practitioner using a conventional laryngoscope, this results in a direct visualisation of the distal portion 12 and in particular of the ball end 210 thereof.

For the practitioner using a videolaryngoscope, the image of the distal portion 12 and/or of the neighbouring anatomical structures is brighter. An iridescent effect on the anatomical walls can also be obtained.

This visualisation of the distal portion 12 as it advances between the anatomical structures of the UA, provides a major advantage on the controllability of the bougie 10.

The medical procedure of the practitioner is thus more precise and therefore faster.

The combination of the segments 121, 122, 123, 124, 125 and the sheath 200 gives the distal portion 12 a great agility.

In particular, the distal portion 12 can thus gradually bend, or even turn 180° on the side of the free end, as it advances through the UA.

Figure 5:
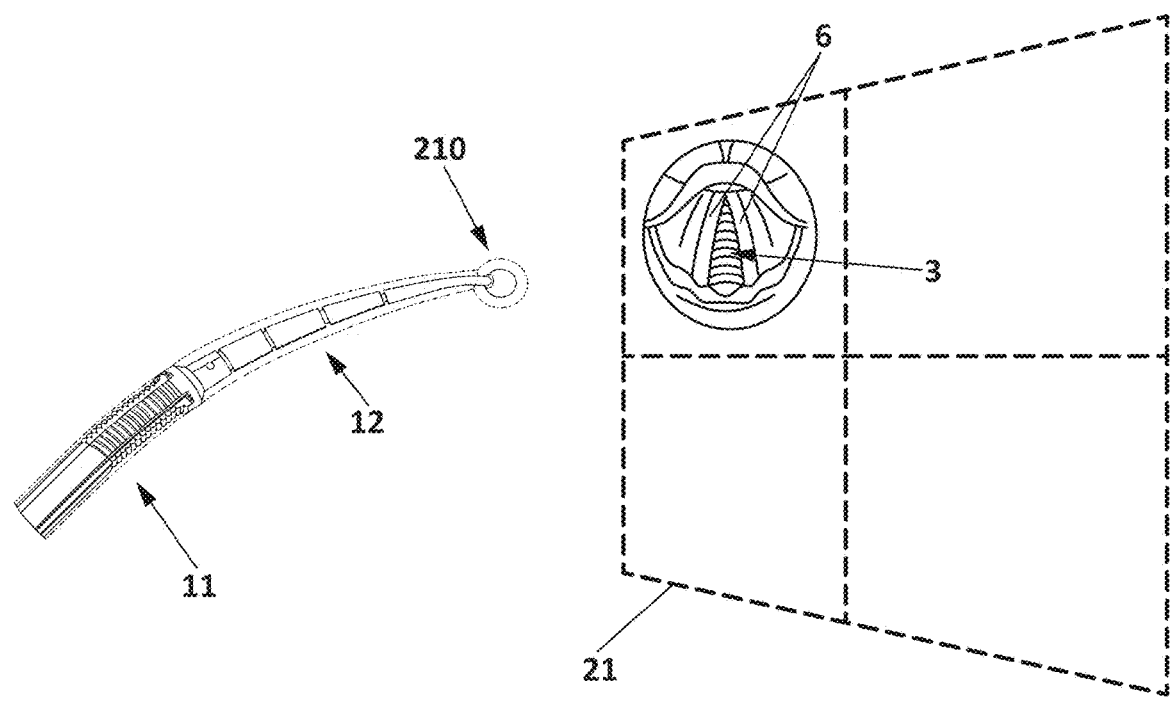
FIG. 5 illustrates an intubation bougie according to an embodiment of the invention in a difficult intubation situation assisted by a videolaryngoscope.

This makes it possible in particular to reach glottis 3 which are offset as illustrated in FIG. 5. The succession of segments 121, 122, 123, 124, 125 enables the formation of a distal portion 12 having a total length to the order of 4 cm.

Such a distal portion 12 therefore makes it possible to reach glottis 3 offset by an offset distance less than or equal to 4 cm with respect to the longitudinal axis B of the bougie 10, while a standard bougie is limited to an offset distance less than 2.8 cm.

Figure 6:
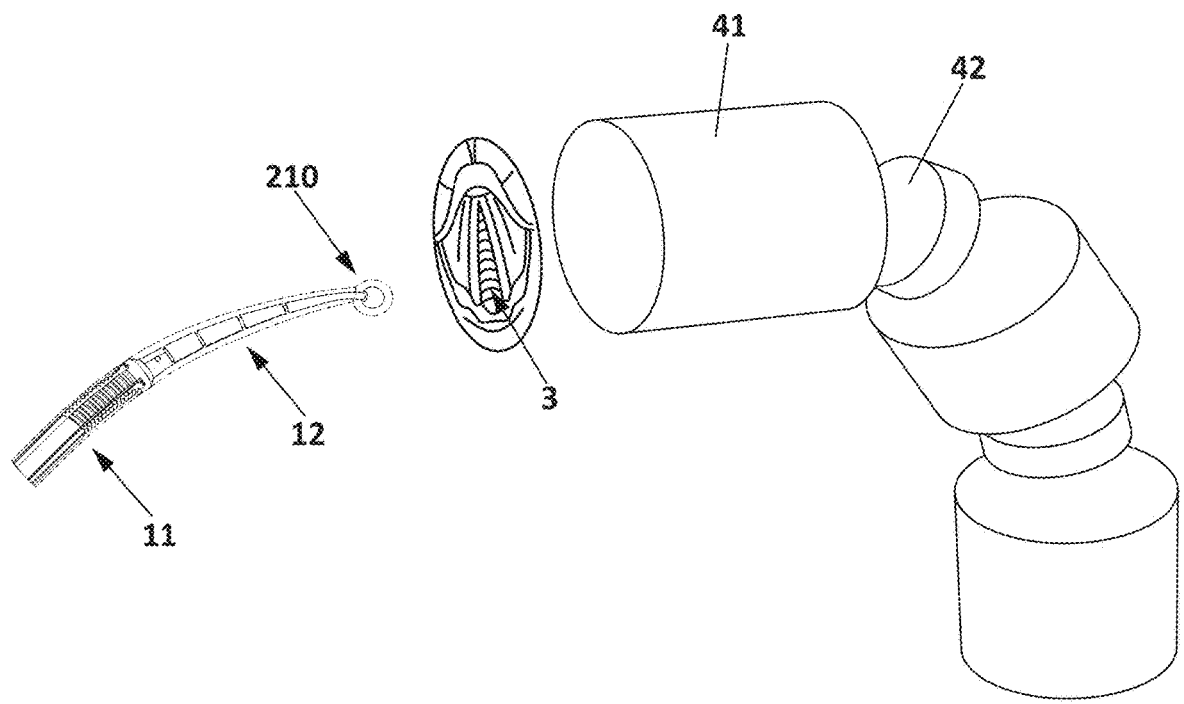
FIG. 6 illustrates the agility of an intubation bougie according to an embodiment of the invention.

In addition, the protruding cartilages of the subglottic region (thyroid 41 and cricoid 42) can block the advance of the distal portion 12 as shown in FIG. 6.

The folding back of the free end of the distal portion 12 thus enables lesions of the larynx and/or of the other anatomical parts such as the vocal cords and the very fragile walls of the trachea to be prevented.

Therefore, the folding back forms a new blunt, non-traumatic end.

This new end remains flexible and agile and enables the advance of the bougie 10 to continue in sub-centimetre orifices. The minimum clearance diameter of such a bougie 10 is advantageously less than 8 mm, while the latter is greater than 12 mm for a standard bougie.

The distal portion 12 of such a bougie thus enables both the safety and the efficiency of the intubation to be improved. The practitioner can therefore intubate the patient more calmly, minimising or even eliminating the risk of injury. The practitioner's motions can be more confident, more voluntary, more daring and consequently more efficient and faster.

Other embodiments of the intubation bougie according to the invention can be envisaged. Only the distinct features of the first embodiment are described below, the other features not described being deemed to be identical to those of the first embodiment.

Figure 4:
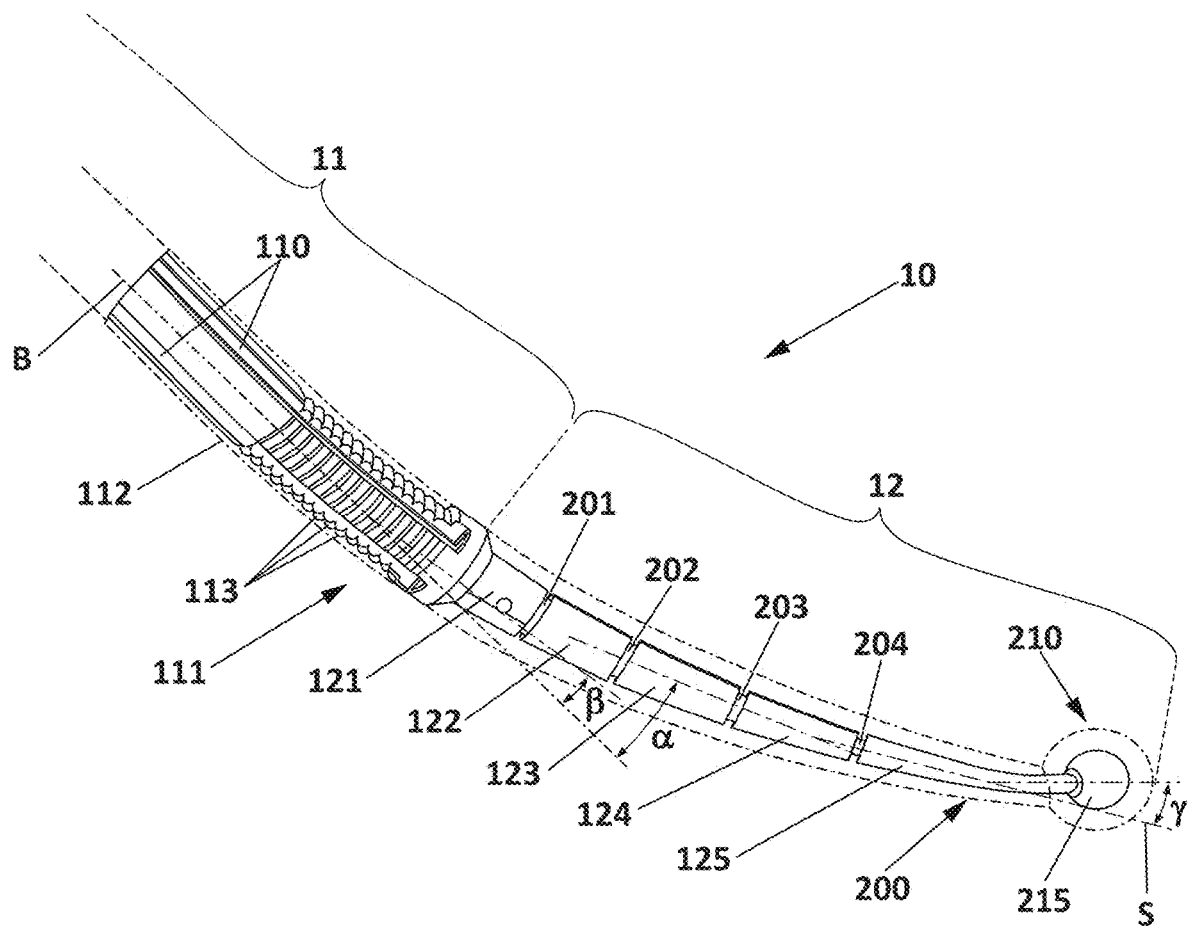
FIG. 4 shows a wired view of the intubation bougie according to a second embodiment of the invention.

According to a second embodiment of the intubation bougie illustrated in FIG. 4, the distal portion 12 of the bougie 10 can comprise five frustoconical segments 121, 122, 123, 124, 125 which are preferably articulated with respect to each other.

The transverse diameter of these segments therefore gradually decreases from one side of the first segment 121 linked to the terminal portion 111 of the body 11 to one end of the terminal segment 125.

For a body 11 with a diameter substantially equal to 4 mm (intubation in adults), the first segment 121 can thus have a transverse diameter substantially equal to 3.2 mm at the junction with the terminal portion 111 of the body 11. This diameter gradually decreases along the five segments 121, 122, 123, 124, 125 until it reaches a transverse diameter approximately equal to 0.8 mm at the end of the fifth segment 125.

This progressive and regular reduction in the transverse diameter along the segments 121, 122, 123, 124, 125 of the distal portion 12 enables a progressive mechanical behaviour to be obtained at the distal portion 12.

The agility, handling ability and controllability of the bougie 10 are thereby improved.

According to one possibility, the terminal segment 125 may comprise a heart ball end 215 at the end thereof, in the same material as the segment 125.

This heart ball end 215 is preferably offset with respect to the axis S of the terminal segment. Typically, this offset forms an angle γ greater than or equal to 45°, and preferably greater than or equal to 50° with respect to the axis S. According to an embodiment, this angle is between 50° and 55°.

This makes it possible in particular, after formation by overmoulding of the sheath 200 and of the ball end 210 in a second elastomer material, to obtain a distal portion 12 comprising a core and a sheath 200 over approximately the entire length of the distal portion 12.

The mechanical behaviour of this distal portion 12 is thus improved. In particular, it is more homogeneous.

The joints 201, 202, 203, 204 between the different segments 121, 122, 123, 124, 125 can be simple transverse grooves, over all or part of the circumference between two adjacent segments.

These grooves may have a depth of a few hundred microns for example.

Typically, the ratio between, on the one hand, the diameter of the segments adjacent to the groove, at the ends thereof adjoining this groove, and on the other hand, the bottom of the groove is between 1, 2 and 3. This enables very good agility and very good precision to be given to the bougie.

A partial groove, and/or a groove over the entire circumference, and/or several grooves can form a joint 201, 202, 203, 204.

The core formed by the segments 121, 122, 123, 124, 125 articulated with respect to each other by such joints 201, 202, 203, 204 can be compared to a spine.

The mechanical behaviour of the distal portion 12 is thus improved.

Furthermore, during the overmoulding operation, the grooves 201, 202, 203, 204 located between the segments 121, 122, 123, 124, 125 of decreasing diameters are filled with the second elastomer material forming the sheath 200.

This elastomer material thus interposed in the grooves 201, 202, 203, 204 forms pads between the segments 121, 122, 123, 124, 125. These pads have a mechanical behaviour similar to that of the intervertebral discs of a spine.

These intersegmentary pads enable both the flexibility and the shape memory return of the distal portion 12 to be optimised.

The deformation of the distal portion 12 is reproducible for each type of pressing of the distal portion 12 against a wall.

For the practitioner, the deformation of this distal portion 12 thus becomes foreseeable when pressing on the anatomical walls. The practitioner can therefore easily assess the situation of the distal portion 12 during blind advance through the UA of the patient.

In the event of difficult intubation, the practitioner can thus effectively handle the bougie 10 according to the sensations perceived from the behaviour of the distal portion 12, without risk for the patient, so as to quickly find a path to the bronchial tubes through the UA of the patient.

This second embodiment provides increased agility, handling ability and controllability of the bougie 10.

Such a bougie 10 enables the practitioner to perform a less risky medical procedure, which is more targeted because it is predictable and therefore quicker, during the advance in the anatomical structures to intubate a patient.

The invention according to second aspect thereof relates to a method of manufacturing a bougie 10. This method preferably comprises the following steps:

Moulding by injection the body 11 and segments 121, 122, 123, 124, 125 of the distal portion 12 from a first thermoplastic elastomer material, preferably medical SEBS.
—Placing at least the segments 121, 122, 123, 124, 125 previously moulded of the distal portion 12 in a mould for overmoulding the distal portion 12.

Overmoulding by injection a sheath 200 in a second thermoplastic elastomer material on the semi-rigid core formed by the segments 121, 122, 123, 124, 125 of the distal portion 12. This second material can be a medical SEBS substantially identical to the first material. According to one possibility, it can be different so as to favour biocompatibility and atraumatic contact with the fragile mucous membranes of the UA.

Alternatively, moulding and overmould by bi-injection the body 11, and the segments 121, 122, 123, 124, 125, then the sheath 200. This enables the prevention of the transfer and/or the displacement of the body 11 and of the segments 121, 122, 123, 124, 125 towards an overmoulding mould for overmoulding the sheath 200.

In view of the above description, it is clear that the invention offers a particularly effective solution for enabling quick and atraumatic tracheal access, while having a limited cost. It is particularly advantageous in difficult intubation situations.

The invention is not limited to the embodiments described above but extends to all embodiments falling within the scope of the claims.

For example, the distal portion 12 may comprise consecutive segments having a sudden change in cross section and other consecutive segments having a regularly and progressively decreasing transverse diameter.

Different types of joints 201, 202, 203, 204 can be combined within the distal portion 12.

The overmoulding of the sheath 200 can be carried out at the segments 121, 122, 123, 124, 125 or can extend beyond the terminal segment 125:

The invention claimed is:

1. An intubation bougie having a rod comprising a body and a distal portion extending from the body, wherein said distal portion comprises at least three segments distinct from each other, arranged successively and configured so as to give the distal portion increasing flexibility from a first end of the distal portion integral with the body to a second free end of the distal portion, opposite the first end and intended to enter the upper airways of a patient,
wherein, as a distance from the body increases, the at least three segments decrease in cross section and increase in length relative to each other,
wherein the at least three segments are articulated with respect to each other, by at least one joint formed between two adjacent segments among the at least three segments, and
wherein the distal portion comprises a core formed by the at least three segments and a sheath overmoulded around the core and formed of a material different from a material of said at least three segments.

2. The intubation bougie according to claim 1, wherein the at least three segments respectively have at least three segmental flexibilities that are different from one another, such that the distal portion has a discontinuous increasing flexibility.

3. An intubation bougie according to claim 1, wherein the at least one joint between the two adjacent segments is formed by a non-continuous variation in cross section between each of said two adjacent segments.

4. The intubation bougie according to claim 1, wherein the at least one joint between the two adjacent segments among the at least three segments is formed by at least one transverse groove.

5. The intubation bougie according to with claim 4, wherein the at least one transverse groove is filled with the material forming the sheath so as to form at least one intersegmental pad.

6. The intubation bougie according to claim 1, wherein at least one among the at least three segments is articulated and has a segmental flexibility enabling a folding by folding back the second free end of the distal portion.

7. The intubation bougie according to claim 1, wherein the body has a terminal axis corresponding to a longitudinal axis of the body, and wherein at least one segment among the at least three segments is offset with respect to the terminal longitudinal axis of the body of the intubation bougie.

8. The intubation bougie according to claim 7, wherein the offset of the at least one segment among the at least three segments with respect to the terminal longitudinal axis of the body of the intubation bougie forms an angle α of between 1° and 80°.

9. The intubation bougie according to claim 1, wherein the body of the bougie comprises a proximal portion extending according to a proximal longitudinal axis, and a terminal portion extending according to a terminal longitudinal axis, said terminal portion being connected to the distal portion of the bougie, and wherein the terminal longitudinal axis of the terminal portion forms an angle β with respect to the proximal longitudinal axis of between 1° and 90°.

10. The intubation bougie according to claim 1, wherein the second free end of the distal portion comprises an attachment element having a ball end.

11. The intubation bougie according to claim 10, wherein the attachment element is offset with respect to a longitudinal axis of a terminal segment among the at least three segments.

12. The intubation bougie according to claim 11, wherein the offset of the attachment element with respect to the longitudinal axis of a terminal segment among the at least three segments forms an angle γ greater than or equal to 30°.

13. The intubation bougie according to claim 1, wherein the body comprises at least one longitudinal slot along a part of the length thereof.

14. The intubation bougie according to the claim 13, further comprising a ventilation sheath configured to cooperate with the at least one longitudinal slot so as to allow passage of fluid towards the distal portion.

15. The intubation bougie according to claim 1, wherein the at least three segments are made of an elastomer material.

16. The intubation bougie according to claim 1, wherein the at least three segments comprise a first segment, a second segment, and a third segment,
    wherein the second segment is a fixed distance from an articulated joint between the first segment and the second segment, and
    wherein the third segment is a fixed distance from an articulated joint between the second segment and the third segment.

17. A method of manufacturing an intubation bougie according to claim 1, comprising at least the following steps:
    moulding the body and the at least three segments of the distal portion of the bougie simultaneously from a first material,
    wherein the at least three segments are molded such that, as a distance from the body increases, the at least three segments decrease in cross section and increase in length relative to each other, and the at least three segments are articulated with respect to each other, by at least one joint formed between two adjacent segments among the at least three segments; and
    overmoulding the at least three segments of the distal portion so as to form a distal portion comprising a core made of the first material and a sheath in a second material different from the first material.

18. The method of manufacturing according to claim 17, wherein the first and/or the second material is an elastomer material.

19. An intubation bougie having a rod comprising a body and a distal portion extending from the body, wherein said distal portion comprises at least three segments distinct from each other, arranged successively and configured so as to give the distal portion increasing flexibility from a first end of the distal portion integral with the body to a second free end of the distal portion, opposite the first end and intended to enter the upper airways of a patient,
    wherein, as a distance from the body increases, the at least three segments decrease in cross section and increase in length relative to each other,
    wherein the at least three segments are articulated with respect to each other, by at least one joint formed between two adjacent segments among the at least three segments, the at least one joint comprising at least one transverse groove extending over a perimeter of the distal portion so as to define a recess between the two adjacent segments, and an intersegmental pad formed in each transverse groove and configured to increase a stiffness of the at least one joint, and
    wherein the at least three segments respectively have at least three segmental flexibilities that are different from one another, such that the distal portion has an increasing flexibility.

* * * * *